US011452955B2

(12) United States Patent
Antikainen et al.

(10) Patent No.: US 11,452,955 B2
(45) Date of Patent: Sep. 27, 2022

(54) ARRANGEMENT AND METHOD FOR DETECTING A DAMAGE OF A FILTER FABRIC OF A DISC FILTER AT A DISC FILTER UNIT USING MICROPHONES

(71) Applicant: VALMET TECHNOLOGIES OY, Espoo (FI)

(72) Inventors: Teemu Antikainen, Espoo (FI); Mika Karaila, Vantaa (FI); Joona Nikunen, Vantaa (FI)

(73) Assignee: VALMET TECHNOLOGIES OY, Espoo (FI)

( * ) Notice: Subject to any disclaimer, the term of this patent is extended or adjusted under 35 U.S.C. 154(b) by 142 days.

(21) Appl. No.: 16/761,625

(22) PCT Filed: Nov. 22, 2018

(86) PCT No.: PCT/FI2018/050850
§ 371 (c)(1),
(2) Date: May 5, 2020

(87) PCT Pub. No.: WO2019/102070
PCT Pub. Date: May 31, 2019

(65) Prior Publication Data
US 2020/0324229 A1    Oct. 15, 2020

(30) Foreign Application Priority Data
Nov. 24, 2017 (FI) ..................... 20177133

(51) Int. Cl.
*B01D 35/143* (2006.01)
*B01D 33/21* (2006.01)
(Continued)

(52) U.S. Cl.
CPC ......... *B01D 35/1435* (2013.01); *B01D 33/21* (2013.01); *B01D 33/804* (2013.01);
(Continued)

(58) Field of Classification Search
CPC .. B01D 35/1435; B01D 35/143; B01D 32/21; B01D 33/804; B01D 33/80; B01D 33/00;
(Continued)

(56) References Cited

U.S. PATENT DOCUMENTS 4,216,093 A *  8/1980  Kane ..................... B01D 33/23
                                                210/247
6,370,943 B1   4/2002  Glucina et al.
(Continued)

FOREIGN PATENT DOCUMENTS

JP    H0119153    8/1989
JP    H10224882   8/1998
(Continued)

*Primary Examiner* — Akash K Varma
(74) *Attorney, Agent, or Firm* — Leason Ellis LLP

(57) ABSTRACT

An arrangement is provided for detecting a damage of a filter fabric (8) of a disc filter (1) at a disc filter unit comprising disc filters. The arrangement includes a measurement bar (20) that includes two or more microphones (21), a store (45) including stored sound samples, at least one alarming means and a processing arrangement (43) for analyzing online sound or sound samples captured by the microphones (21). The processing arrangement (43) is connected to the microphones (21), the store (45) and the at least one alarming means. A method is also disclosed for detecting a damage of a filter fabric (8) of a disc filter (1) at a disc filter unit.

10 Claims, 3 Drawing Sheets

Figure 1:
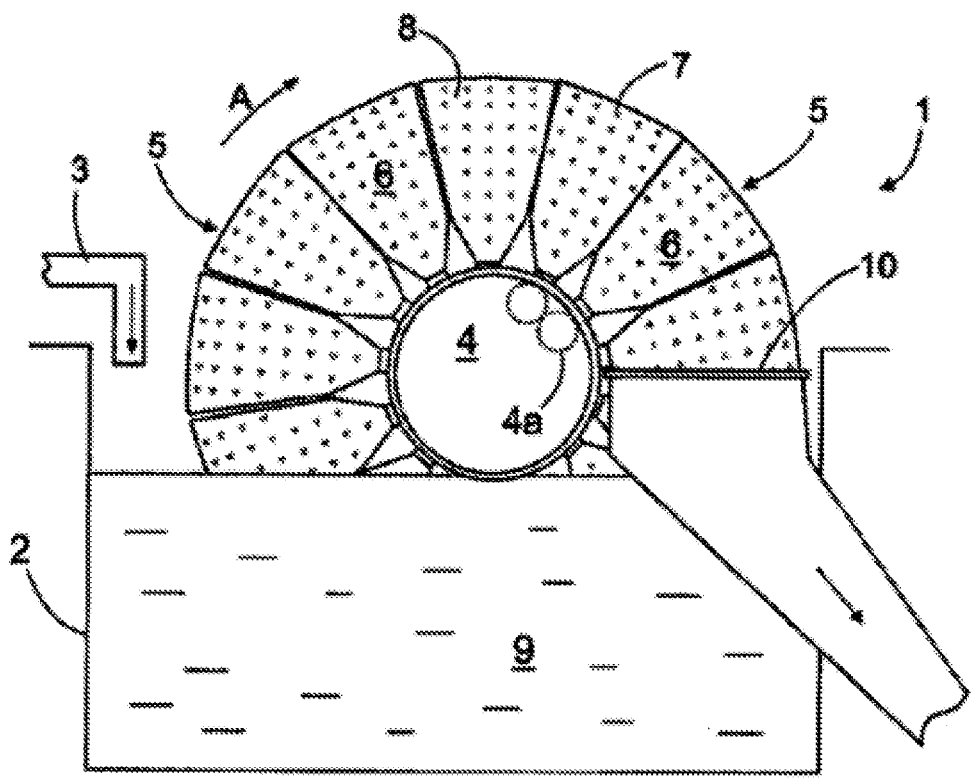

(51) Int. Cl.
*B01D 39/08* (2006.01)
*B01D 33/80* (2006.01)
*G01N 29/14* (2006.01)
*G01N 29/12* (2006.01)
*G01N 29/44* (2006.01)
*G08B 5/36* (2006.01)
*H04R 1/40* (2006.01)

(52) U.S. Cl.
CPC ............ *B01D 39/08* (2013.01); *G01N 29/12* (2013.01); *G01N 29/14* (2013.01); *G01N 29/4427* (2013.01); *G08B 5/36* (2013.01); *H04R 1/406* (2013.01); *B01D 2201/287* (2013.01); *B01D 2201/52* (2013.01); *B01D 2201/54* (2013.01); *B01D 2201/56* (2013.01); *B01D 2239/06* (2013.01); *G01N 2291/0237* (2013.01); *G01N 2291/0289* (2013.01)

(58) Field of Classification Search
CPC ...... B01D 39/08; B01D 63/08; B01D 65/102; B01D 2201/287; B01D 2201/52; B01D 2201/54; B01D 2201/56; B01D 2201/31; B01D 2239/06; B01D 2273/24; G01N 29/12; G01N 29/14; G01N 29/4427; G01N 29/44; G01N 29/07; G01N 29/2481; G01N 29/4436; G01N 29/46; G01N 29/24; G01N 29/00; G01N 2291/0237; G01N 2291/0289; G01N 15/08; G01N 2015/084; G01M 13/028; G01M 3/00; G01H 17/00; G08B 5/36; F04B 51/00; F03D 7/0212; H04R 1/406; H04R 1/40; H04R 1/34; H04R 1/342; C07D 333/16; C07D 413/04
USPC .......................................................... 210/739
See application file for complete search history.

(56) References Cited

U.S. PATENT DOCUMENTS

| 8,059,489 | B1* | 11/2011 | Lee | ............ | G01N 29/46 367/136 |
|---|---|---|---|---|---|
| 2006/0254357 | A1* | 11/2006 | Ens | ............ | F04B 51/00 73/593 |
| 2009/0290729 | A1 | 11/2009 | Zhang | | |
| 2010/0143119 | A1* | 6/2010 | Kooijman | ............ | F03D 7/0212 416/1 |
| 2015/0013435 | A1 | 1/2015 | Sugiyama et al. | | |

FOREIGN PATENT DOCUMENTS

| WO | WO 2004017038 | | 2/2004 | |
|---|---|---|---|---|
| WO | WO 2014/170533 | | 10/2014 | |
| WO | WO 2014/170533 | A1 * | 10/2014 | ............ B01D 33/80 |
| WO | WO 2017005971 | | 1/2017 | |
| WO | WO 2017005972 | | 1/2017 | |

* cited by examiner

ARRANGEMENT AND METHOD FOR DETECTING A DAMAGE OF A FILTER FABRIC OF A DISC FILTER AT A DISC FILTER UNIT USING MICROPHONES

CROSS-REFERENCE TO RELATED PATENT APPLICATIONS

This application is a U.S. National Phase Application under 35 U.S.C. § 371 of International Patent Application No. PCT/FI2018/050850, filed Nov. 22, 2018, which claims the priority of Finnish Patent Application No. 20177133, filed Nov. 24, 2017, each of which is incorporated by reference as if expressly set forth in its entirety herein.

FIELD

The invention relates to an arrangement and a method for detecting a damage of a filter fabric of a disc filter at a disc filter unit.

BACKGROUND

Continuous disc filters are used in mining industry, metal processing, chemical industry, pulp and paper industry and other processes such as food and pharmaceutical manufacturing. Most advantageous applications are dewatering of solids which are free settling and form into an easily discharged, non blinding cake.

The U.S. Pat. No. 4,216,093 published in 1980 describes a sector based rotary suction disc filter. Main working principle is generating negative pressure that sucks the liquid through the sides of filter sectors and collects the solids so that they can be easily removed from the surface with blow. The filter sectors can also be covered with cloth or fabric that is exchangeable. Changing the filter fabric provides easy way of managing the filtering parameters of the disc filter and provides thus advantages over prior solutions. The common problem with all continuous disc filters with fabric filter coating are the damages in the filter fabric. The damages are typically incisions that let the slurry inside the disc filter sectors and through the piping into the pumps. This can clog the piping and create excessive wear and additional faults. The inspection of filter fabric is done by a maintenance person checking each cake release standing next to the filter. This is typically time consuming and dirty job. A fault in filter cloth can also be detected measuring the purity of the filtrated fluid. Both ways lag on detection or provide incomplete information. There is a great need to detect the incisions automatically, accurately and as soon as possible.

BRIEF DESCRIPTION

The present invention seeks to describe an arrangement and a method for detecting damages of filter fabric with continuous disc filters, where the arrangement comprises of two or more microphones that are attached on a measurement bar above or beside the disk filter, a processing arrangement that can process the sound signals that come from the multitude of microphones and detect damages of disk filter fabric by finding anomalies in the sounds or by comparing with fingerprinted samples of sounds.

LIST OF DRAWINGS

Figure 2:
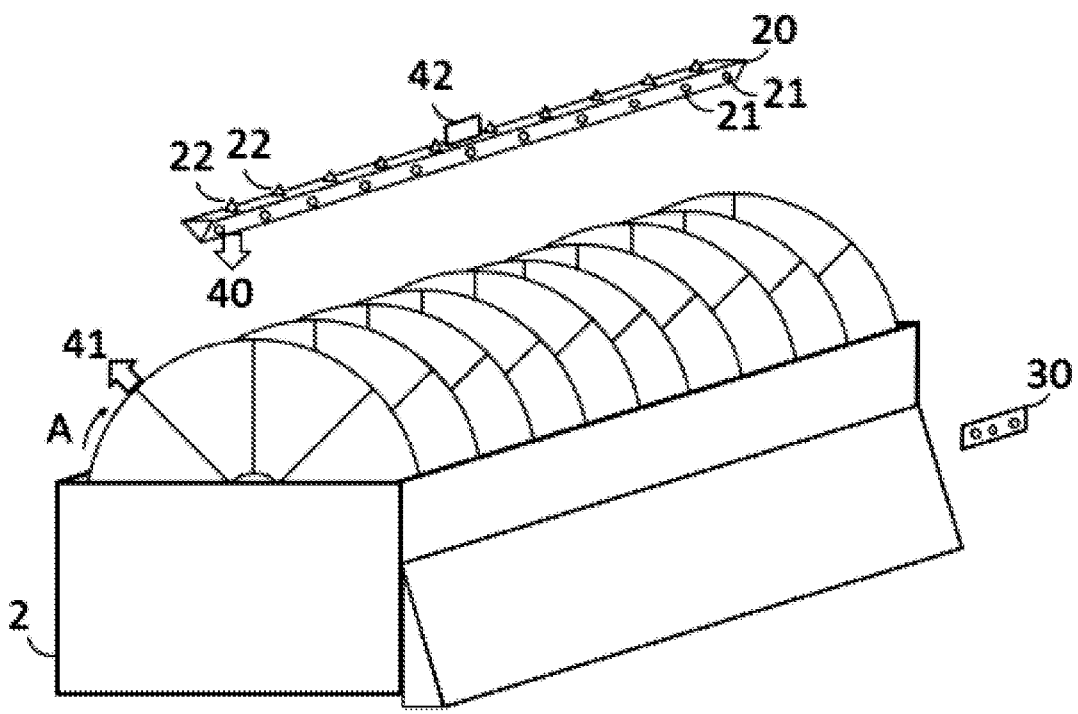
Figure 3:
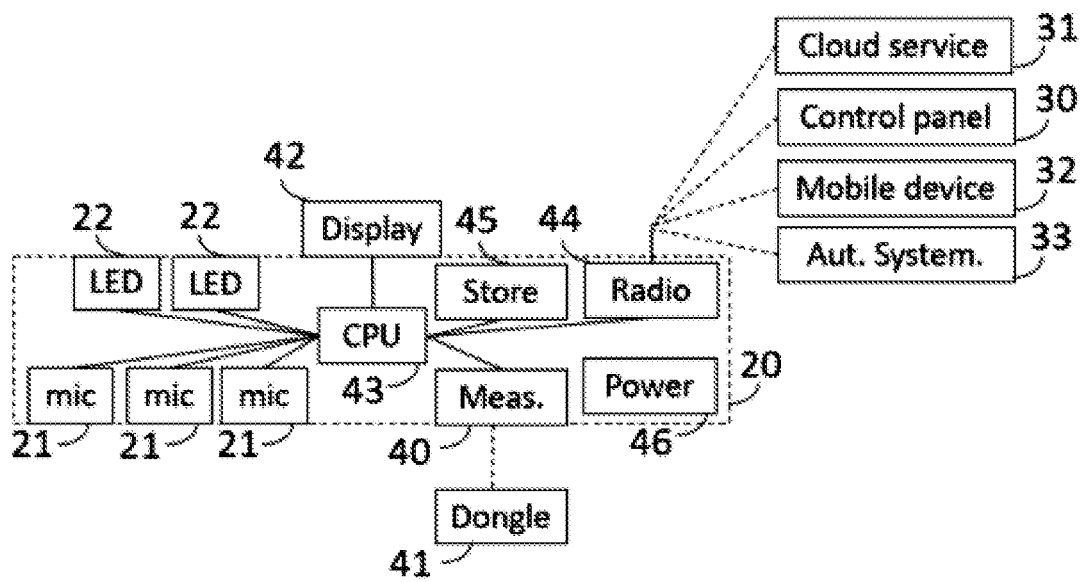
Figure 4A:
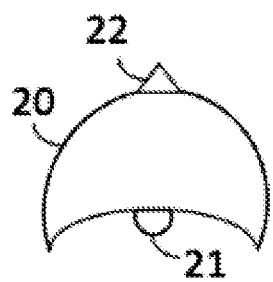
Figure 4B:
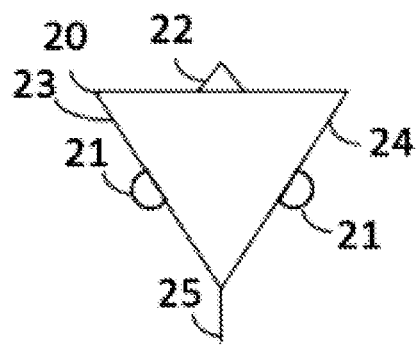
Figure 5:
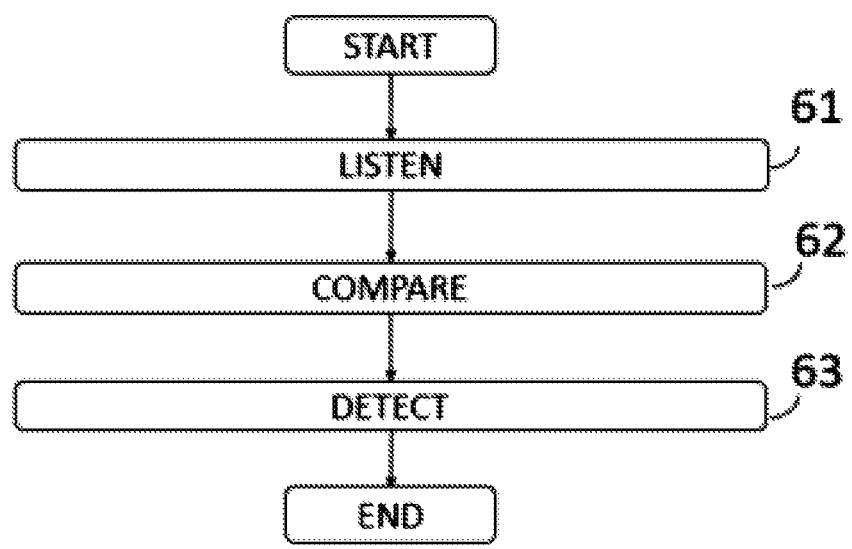

Example embodiments of the present invention are described below, by way of example only, with reference to the accompanying drawings, in which FIG. 1 shows disc filter; and
FIG. 2 shows one filter unit and a measurement bar; and
FIG. 3 shows the measurement bar components and connections; and
FIGS. 4a and 4b shows different profiles for the measurement bar; and
FIG. 5 shows method for the invention.

DESCRIPTION OF EMBODIMENTS

FIG. 1 shows a disc filter 1 that comprises a basin 2 to which a solution formed by solid matter and liquid is led from one or more supply channels 3. Further the disc filter comprises a body 4 rotatable around a horizontal axis. The body 4 comprises of several pipes 4a. On the outer circumference of the body, several essentially triangular sectors 5 are placed side by side so that the sectors form a relatively narrow disc-like structure around the body. One body can comprise several disc like structures of this type arranged at a desired distance from each other in the axial direction. The triangular side surface 6 of each sector 5 has openings 7. A filter fabric 8 or the like can be arranged against the side surface to act as a filtering layer. The body 4 of the disc filter is rotated around its axis in direction A, whereby each sector 5 at a time dips into the solution 9 in the basin. A negative pressure can be applied through the body 4 so that it affects also inside each sector 5. While the sector is dipped into the solution the negative pressure sucks the solution against the filter and liquid can pass through the filter and flow through the pressure flow channel and through the neck of the sector and on through the body pipelines 4a out of the disc filter. The solid matter in turn stays on the surface of the filtering fabric 8 from which it can be removed with doctoring blades or pressure medium jets or blown out using pressure pulse so that the solid "cake" is dropped in to opening 10 of discharge shaft before the next filtering cycle.

FIG. 2 shows a filtering unit, that comprises of several disk filters that are located in the same basin 2. A measurement bar 20 that is located over or beside the filtering unit comprises of microphones 21, LED lights 22 and processing arrangement. It may also comprise measuring means 40 to detect the orientation of the disc filter and display 42 to express information of the disk filter. A local control panel 30 is also shown.

FIG. 3 shows components of a measurement bar 20. There can be two or more microphones 21, LED lights 22, measurement means 40, display 42, wireless communication means 44, store 45 and a power unit 46 providing electricity to other components. All aforementioned are connected either directly or via bus to processing arrangement 43, such as CPU. There can be wireless connections to cloud service 31, local control panel 30, mobile device 32 and automation system 33.

The measurement bar comprises microphones 21 that can listen the sounds in the disc filter environment. The microphone can listen at least the frequencies of 400 Hz-3400 Hz. More preferably the bandwidth can be 300 Hz-7000 Hz. Sometimes it would be beneficial to listen the full spectrum of 20 Hz-20000 Hz. The microphones are connected with suitable A/D converters to digitalize the signal. The digitalized signal can be passed to processing arrangement 43.

The processing arrangement may be an ARM processor or any other processor or microchip capable of doing needed calculations. Additional processors or chips can be used to make specialized tasks e.g. FFT or wideband comparisons. The processing arrangement can also be a single chip solution with the wireless communication means 44. The radio that is used in measurement bar can be a data transfer capable radio available on the market. E.g. Bluetooth, Bluetooth Low Energy, ZigBee, 6loWPAN, WiFi or cellular radio.

The store 45 is a digital storage for audio samples and fingerprints. The store can be a volatile memory or nonvolatile memory. If a volatile memory is used, then stored audio samples and fingerprints cannot survive electricity shortage. However, if volatile memory is used it can be synced with cloud service 31 that can act as nonvolatile memory.

The measurement bar may also comprise alarming means. These can be lights, loudspeakers, horns or screens. Having granular alarming is important addition to accurate detection of damages. The lights can be LED lights 22 having one or more color options. These LED lights are attached to the measurement bar so that each LED light represent one disk filter. There can be a color code on possible status for the disk filter, e.g. green=OK, yellow=POSSIBLE FAULT, red=DAMAGE. The LEDs may also be used to indicate the actual filter sector that is damaged by previous color codes or brightness changes or blinking. This way the user can see when the damaged filter sector is on upright position.

LED lights can also be set into a matrix shape display 42 to enable displaying symbols such as numbers and letters. This way the order number of damaged disk filter may be shown. One disc filter unit may accommodate up to 14 disc filters that can comprise up to 14 sectors. Displaying the number of damaged disk filter eases finding the actual sector faster. The alarming means may also be done with wireless communication means 44 such as cellular modem that can send SMS or other type of instant messages to mobile devices 32.

The measurement bar may also include other sensors that could be used to detect damages on disk filter or overall condition monitoring of disk filter unit. Such sensors could be infrared temperature sensors, cameras and gas sensors.

Sometimes the whole disc filter unit may be covered by a cover. This is done due cleanliness, safety, design or other reason. If such cover is applied the measurement bar or at least the microphones of the measurement bar can be installed within the cover.

FIG. 4a shows one possible cut through of the measurement bar 20. The important issue is the location of the microphone. The measurement bar has a parabolic shape and the microphone is located in the focal point. This way the microphone has more focused listening angle. The parabolic shape can be curved to the whole length of the measurement bar making a parabolic profile to one edge. Another approach is to create parabolic reflectors to each microphone separately.

FIG. 4b shows another possible cut through of the measurement bar 20. One microphone is attached on both edges 23, 24 of the bar. This way the microphones can detect sounds coming from different sectors of the disk filter. The separation of the sounds can even be enhanced by adding a rim 25 so that there is longer air distance from microphone to microphone. The measurement bar can also be split in two so that the distance between microphones becomes even bigger. This way the separation of sounds is better.

There can be also a separate control panel 30 for controlling the measurement bar. The control panel can be wirelessly connected to the measurement bar. The following functions may be applied to the control panel: starting the measurement procedures, stopping the measurement procedures, resetting the measurement procedures, acknowledging detected damage, expressing a damage situation. The same functions that are in control panel can also be with other mobile devices 32 such as smartphones or tablets that are connected to the measurement bar using wireless communication means 44.

The measurement bar can be connected with the facility's automation system 33 using wireless communication means 44. Any data, processed data and alarms handled by the processing arrangement 43 can be passed to the automation system. The automation system can store the data, visualize the data and merge the alarms with automation system alarm handling. The automation system can also be used as control panel.

The measurement bar can be connected with cloud service 31 using wireless communication means 44. A cloud service is a processing arrangement that resides in the internet. A cloud service can provide different functions. It can store the data from multiple measurement bars. It can make calculations based on data. The calculations may be such as comparing the fingerprints, detecting differences from averages, detecting slow deviations and detecting cyclical issues. The cloud service can provide reports and alarms depending on detections. The measurement bar may act as a gateway and pass all data from microphones directly to cloud service. Or it can make Fourier transforms for the sound spectrum and pack the data before sending to the cloud service. The cloud service can also be used to monitoring of multiple disk filter units and managing alarms from multiple units.

The invention is based on discovering damaged filter fabrics based on sounds coming from damaged fabrics. In normal condition the disk filter does emit a certain cyclic sound based on its cyclic working principle. This sound environment can be stated as nominal level. There can be external machines around the disk filter unit that provide additional sounds to the environment. If no sporadic changes are occurring all this sound environment can be stated as nominal level for certain disk filter.

The sound phenomena that reveal a damage in a disk filter fabric may be constant whizzing voice that can change when the pressure changes. It may also be humming voice with changing pace depending on the size of the damage. Typically sounds are hearable only when the sector is above solution 9 level. However, there can be sounds that comes from damages when they are slightly submerged. Some sounds can be heard only when the negative pressure is applied to the sector and some only when positive pressure is applied.

Using microphones in the measurement bar the sound environment can be listened. The listening can be continuous or sampled. If sampled listening is used it can be periodic sampling from one microphone to another or all microphones can be used in the same periodic sampling. All captured sounds are A/D converted and provided to the processing arrangement 43. The processing arrangement is used to compare the online sound or sound samples to historical sound environment or tagged sound samples. This historical sound environment is an averaged sound environment of working conditions with the current disk filter unit. The tagged sound samples are typically examples of damages. They can be from the currently used disk filter unit or from other disk filter units. Also sound sample examples of non-damages can be used. The comparisons can be made directly with the sound samples or by using frequency conversion to find most powerful frequencies of the sound.

In a simple approach a microphone can be listening the audio environment and catching short e.g. 0.5 sec.-1 sec. sound samples periodically e.g. every 5 seconds or every 10 seconds. The samples can be handled with FFT and stored as audio frequency spectrums over the available band. The spectrums are running averaged over some period e.g. several minutes or hours. After every sample, the processing arrangement access the previous audio frequency spectrum and compares the spectrum with the stored average spectrum of certain predetermined time period. If the comparison of spectrum shows at least one new peak with within small frequency band e.g. 50 Hz or 100 Hz, the system may trigger alarm. This kind of analyzing may miss some damages since there can be humming sequences that cannot be captured with single FFT.

Using two or more microphone makes it possible to detect the location of the damaged disk filter based on the timing of the sound coming to the microphones. Since the sound propagation can be considered direct from disk filters to microphones the calculation of travel time gives good approximation of the damaged disk filter even when using only two microphones. The more microphones are spread into the measurement bar the more accurate is finding of the damage. If there is approximately equal number of microphones than disk filters, and the microphones are spread to the measurement bar with the full length of the disk filter unit, the location of the damaged disk filter can also be found by the sound level on the closest microphone.

Learning algorithms can be used to analyze the damages better. Especially faults that provide humming sounds can be captured this way. Learning algorithms can be based on any modern approach e.g. artificial neural networks.

The learning algorithm can be taught using human as elector for findings. There can be an input method in automation system 33, mobile device 32 or control panel 30 to select whether the automatically detected damage is real or not. The user may agree or disagree with the detection and this information is added to the machine learning algorithm.

The measurement bar may also forward either the captured sound sample or the spectrum to a cloud service 31. This way it is possible to store large amount of sound samples or spectrums for further processing. By using learning algorithms, the sound samples or spectrums can be combined with relevant information about the damages of the disc filter. This labeled sample can be called as fingerprint. Every new sample can be compared against known fingerprints and alarms can be triggered if similarity is found Noise cancelling methods can be used to clear the signal managed by processing arrangement from surrounding noise. The noise cancelling can be done with common noise canceling algorithms. Additional microphone can also be attached to the system for noise cancelling. This additional microphone can be oriented or covered so that sounds from disk filter are not accessing it directly.

In one embodiment, the bar has a measurement means 40 that is used to detect the cycle speed of the disk filter. Knowing the cycle speed of the filter is advantageous for detecting the damages on filter fabrics. By knowing the cycle speed the processor can relate the coming sounds to certain filter sectors due to periodic timing. Typically, the measurement bar does not know the cycle speed. In some cases, there can be a wireless connection to automation system 33 that could know the cycle speed. The measurement element can be a radio or camera. The measurement work in conjunction with a dongle 41. The dongle can be a beacon, transponder or a token. The measurement element can be a passive radio that listens for a beacon that is attached into one or more of the sectors. The beacon transmits periodically signal which RSSI can be detected by the measurement element. Once the RSSI has best value the location of that sector is known and thus the orientation of the disk filter is known. The used technology can be e.g. Bluetooth. The measurement means 40 can also be active radio that transmit some signal which is reflected back or which energy is used to power the transmission from the transponder. The used technology can be e.g. RFID. The antenna used with the measurement element can be omnidirectional, but for more accurate locationing directional antenna elements may be used. When using camera as measurement means 40, one of the sectors may accommodate a token that can be easily distinguished from other sectors. The measured cycle speed can also be displayed in a display 42.

The invention can also be used in combination with previous means to detect damages with filter fabrics. A visual inspection in combination of mobile device can be used as input method to describe found damages. This information can be used to teach the processing arrangement to detect correct sound phenomena. The increased impurity measurement from purity measurement of filtrated fluid can be similarly used to express a damage. This information can be directly wirelessly transmitted to the measurement bar or by using automation system as a proxy. This way the learning algorithm of the measurement bar can be taught to be very accurate.

The invention claimed is:

1. An arrangement for detecting a damage of a filter fabric (8) of a disc filter (1) at a disc filter unit disc filters, wherein the arrangement comprises a measurement bar (20) that comprises two or more microphones (21), a store (45) including stored sound samples, at least one alarming means and a processing arrangement (43) for analyzing online sound or sound samples captured by the two or more microphones (21), the processing arrangement (43) being connected to the two or more microphones (21), the store (45) and the at least one alarming means.

2. The arrangement according to claim 1, wherein the at least one alarming means comprises LED lights (22) for visually informing users about a detected damage, the LED lights (22) are attached to the measurement bar (20) in such a manner that each LED light represents one of the disc filters.

3. The arrangement according to claim 1, wherein the at least one alarming means comprises a wireless communication means (44) for transmitting information about a detected damage.

4. The arrangement according to claim 1, wherein the arrangement comprises a wireless input for confirming whether a detected damage is real.

5. The arrangement according to claim 4, wherein the wireless input is in an external control panel (30), a mobile device (32), or an automation system (33).

6. A method for detecting a damage of a filter fabric (8) of a disc filter (1) at a disc filter unit comprising disc filters, wherein the method is accomplished by an arrangement comprising a measurement bar (20) that comprises two or more microphones (21), a store (45) including stored sound samples, alarming means and a processing arrangement (43) for analyzing online sound or sound samples captured by the two or more microphones (21), the arrangement being connected to the two or more microphones (21), the store (45) and the alarming means, the method comprises:

listening (61) to the online sound or a sound sample from the disc filters with the two or more microphones (21) located on a side or above the disc filter unit, comparing (62) the online sound or the sound sample by using the processing arrangement (43) including the stored sound samples, detecting (63) the damage of the filter fabric (8) by finding similarities between the online sound or the sound sample and the stored sound samples that are known to be samples from damaged filters.

7. The method according to claim 6, wherein the method comprises distinguishing a damaged disc filter (1) by calculating a travel time of the online sound or sounds forming the sound sample to the two or more microphones (21).

8. The method according to claim 6, wherein the method comprises alarming by the alarming means by lighting up or changing a color of a LED light (22) located above a damaged disc filter (1).

9. The method according to claim 6, wherein the method comprises:

transmitting with wireless communication means (44) incoming audio as audible samples to a cloud service (31), comparing within the cloud service (31) a new audio sample with fingerprints from previously transmitted samples, detecting the damage of the filter fabric (8) by finding similarities between the new audio sample and the fingerprints that are known to be samples from the damaged filters.

10. The method according to claim 6, wherein the method comprises:

listening (61) to the sound samples from the disc filters (1), which form an incoming audio frequency spectrum, with the two or more microphones (21) located on the side or above the disc filter unit, comparing (62) the incoming audio frequency spectrum with an averaged audio frequency spectrum collected during a predetermined time period, and detecting (63) the damage of the filter fabric (8) by finding a new peak on a small frequency band.

* * * * *